United States Patent [19]
Aghevli

[11] Patent Number: 5,873,729
[45] Date of Patent: Feb. 23, 1999

[54] MATHEMATICAL TRIANGLE KIT AND METHOD OF USE

[76] Inventor: Behrouz B. Aghevli, 8380 Greensboro Dr., No. 921, McLean, Va. 22102

[21] Appl. No.: 800,980

[22] Filed: Feb. 19, 1997

[51] Int. Cl.⁶ .................................................. G09B 23/04
[52] U.S. Cl. ...................................... 434/211; 273/157 R
[58] Field of Search .................................... 434/196, 208, 434/207, 195, 211; 273/257 R

[56] References Cited

U.S. PATENT DOCUMENTS

| | | | |
|---|---|---|---|
| 356,167 | 1/1987 | Shannon | 434/196 |
| 547,217 | 10/1895 | Reitchum | 434/196 |
| 1,836,870 | 12/1931 | Quer | 434/195 |
| 3,204,343 | 9/1965 | Pollock | 434/195 |
| 3,229,388 | 1/1966 | Smith | 434/195 |
| 3,414,986 | 12/1968 | Stassen | 434/195 |
| 4,332,567 | 6/1982 | Nogues | 434/195 |
| 4,548,585 | 10/1985 | Kelly | 434/195 |
| 4,585,419 | 4/1986 | Rinaldelli | 434/195 |
| 5,076,793 | 12/1991 | Aghevli et al. | 434/196 |
| 5,108,291 | 4/1992 | Kvo | 434/208 |
| 5,137,452 | 8/1992 | Pollock | 434/195 |
| 5,683,252 | 11/1997 | Tsao | 434/195 |

*Primary Examiner*—Paul J. Hirsch

[57] ABSTRACT

A mathematical triangle kit designed to teach children and adults mathematical and symmetry skills utilizing various sized patterned blocks. By manipulating the patterned blocks the participant learns mathematical skills, such as fractions, multiplication, trigonometry, and geometry. Additionally, by manipulating the patterned blocks the participant also learns geometric relations, such as mirror images and other symmetry relationships amongst the patterned blocks. In the preferred embodiment, the mathematical triangle kit comprises three sets of various sized and colored right triangles with 30° and 60° bases.

17 Claims, 8 Drawing Sheets

MATHEMATICAL TRIANGLE KIT AND METHOD OF USE

FIELD OF THE INVENTION

The present invention relates generally to a puzzle game designed to teach children and adults mathematical and symmetry skills utilizing various sized patterned blocks. In particular, the present invention relates generally to teaching fractions, multiplication, division, addition, subtraction, and trigonometry skills as well as geometrical recognition and relational skills, such as geometry, utilizing various sized triangular and multi-colored blocks in an entertaining puzzle game format.

BACKGROUND OF THE INVENTION

Learning mathematical and geometric recognition and relational skills plays an integral role in an individual's ability to effectively perform in our technologically advanced society. Over the last few decades the art of mathematics has slowly become an art of the past with the advent of computers and other technologically advanced machinery. Additionally, the art of geometric recognition and relational skills, such as the appreciation for inverse and mirror symmetry has also become antiquated. As such, those skills that once brought our society to the forefront of technology are slowly being eroded away, ironically, by the mastery and use of that same technology. This is especially relevant in the classrooms around the industrialized world, whereby essentially every classroom has a computer and every student is allowed to use a calculator for the calculation of even the simplest mathematical equations. Effective mathematical and recognition skills can only be learned through effective teaching techniques, memorization, and extensive application, which, unfortunately, are not currently being actively taught.

In light of the importance of a person's mathematical abilities, instructors are faced with the daunting task of teaching children as well as adults effective mathematic skills, which begin with simple recognition of geometric relations to more advanced applications such as multiplication. Such teaching is especially critical to children—those youngsters that will advance our society into the twenty-first century. Methods of teaching these skills have been quite stagnant over the past several decades and have included rote memorization and recitation. Further, current methods of teaching are typically mere variations of old techniques that do not appear to hold the interests of those being taught.

Several inventors have attempted to devise methods for teaching the above-referenced skills in a more fun-filled environment; however, no single or combination of inventions teach these skills so as to teach both complicated mathematical skills, such as fractions, and geometric recognition skills, such as inverse relations.

For example, teaching fractions have relied essentially on rectangular manipulatives and other geometrical shapes. Most notable of these methods of teaching mathematical and geometric recognition skills is the Tangram puzzle, also known as Chinese puzzles. By way of further example, U.S. Pat. No. 5,108,291 to Kuo discloses a supplementary teaching instrument that employs a number of rectangular blocks of a prescribed shape which occupy a predefined area when assembled. This invention also discloses the use of triangular blocks of various shapes.

U.S. Pat. No. 1,533,507 to May discloses a puzzle consisting of four pieces, whereby the four pieces, when laid down correctly, produce a rectilinear outline. This invention further discloses blocks having different colors, whereby in order to form a rectilinear shape one of the blocks must comprise the opposite color of the remaining blocks.

Lastly, U.S. Pat. No. 237,464 to Anthony discloses a puzzle consisting of eight right triangles of certain proportions, none of which are 60°/30° right triangle.

Others references which may be relevant include U.S. Pat. No. 260,594 to Mehner; U.S. Pat. No. 1,119,309 to Nordman, U.S. Pat. No. 1,261,710 to Coyle; U.S. Pat. No. 2,885,207 to Wormser, U.S. Pat. No. 3,178,186 to Lee, U.S. Pat. No. 4,365,809 to Barry; U.S. Pat. No. 1,657,736 to Bishop; U.S. Pat. No. 4,429,200 to Kanbar; U.S. Pat. No. 4,531,741 to Eskina; and U.S. Pat. No. 2,394,864 to Luton. Additionally, the 1993 Creative Publications Catalog discloses the "The Pattern Blocks" (order #034786)and "Notes on a Triangle" (order #034786). The pattern blocks comprise hexagons, trapezoids, squares, parallelograms, rhombus's and equilateral triangles, whereas the "Notes on a Triangle" comprise large, medium, and small equilateral triangles, small and large isosceles triangles, and small and large right triangles. It should be noted that these references are not necessarily analogous art, but which may only be relevant to the present invention.

All of the above references use various sized blocks, including squares, rectangles, and triangles, to teach either mathematical or geometric skills. While such skills are individually important, it is only through the simultaneous teaching of such skills that effective mathematic and geometrical recognition skills can occur. Additionally, current teaching methods do not entertain and encourage the student's continued participation. A further shortcoming of the current teaching methods are their inability to cater to the varying ability levels of participants, to wit the individual who is incapable of simple addition as well as the individual who is capable of calculating complex fractions and recognizing advanced shapes and their relations to one another. Thus, present devices and methods of teaching the above mathematic and geometric relation skills—i.e., addition, subtraction, multiplication, division, fractions, and shape relations (e.g., mirror images, rotational relationships between objects, etc.)—are not as effective as they might be in that they do not provide the necessary means for teaching these skills in a rudimentary as well as advanced manner.

A vehicle for teaching the needed mathematic and geometric skills would comprise a puzzle game having various sized triangular blocks and holding trays, wherein the triangular blocks would be placed within the holding trays. The number of triangular blocks in the holding tray would depend on the size of the blocks and the holding trays. The game would further comprise a number of multi-colored triangular blocks so that individuals can arrange the blocks, utilizing the colors, into various geometric shapes and relations—e.g., mirror symmetry, and inverse relationships between the patterned blocks. This system should use a variety of techniques so that all participants can learn the nuances of mathematics and geometric relations.

SUMMARY OF THE INVENTION

It is therefore an object of the present invention to teach children and adults the concepts of mathematic skills utilizing a puzzle game having triangular blocks.

It is also an object of the present invention to teach children and adults geometric recognition skills utilizing a puzzle game having triangular blocks.

It is a further object of the present invention to teach children and adults pattern building skills utilizing a puzzle game having triangular blocks.

It is still a further object of the present invention to teach symmetry skills utilizing a puzzle game having triangular blocks.

It is still another object of the present invention to provide an puzzle game utilizing multi-colored triangular blocks that will entertain and keep the attention of the participants while they learn mathematical and geometric recognition skills.

These and other objects and advantages of the present invention will be apparent to those of ordinary skill in the art upon inspection of the detailed description, drawings, and appended claims.

The "Mathematical Triangle Kit and Method of Use," ("the present invention") is contemplated for use by children and adults for learning mathematical and geometric recognition skills. A representative sample of these skills include addition, subtraction, multiplication, division, geometry, and trigonometry as well as the recognition of mirror and rotational symmetry images. The present invention can also be utilized for a wide variety of purposes which include 1) teaching basic mathematic skills, 2) teaching advanced mathematic skills, 3) teaching symmetry amongst objects and shapes, and 4) entertainment reasons. As such, the present invention is used in a variety of different circumstances and for various teaching levels.

The present invention is a puzzle game designed to teach children and adults mathematics and geometric recognition skills, utilizing multi-colored triangular blocks and holding trays. It is envisioned that the multi-colored triangular blocks comprise various sizes so that varying numbers of blocks can fit within the holding trays. This affords the user the means in which fractions and other mathematical skills can be learned. Additionally, the use of the multi-colors also assists the user in the recognition of various symmetrical shapes when displayed in a certain manner—i.e., colored triangles and squares.

How to Use:

In general, the user begins with a large, medium and small holding tray and a set of large, medium, and small sized right triangles with base angles of 30° and 60° (hereinafter referred to as "60°/30° right triangles"). The user thereafter places the various sized triangles in the holding trays. For example, the user places eight large triangles in the large tray, eighteen medium triangles in the large tray, or twenty-four small triangles in the large tray. In the alternative, the user can place any combination of the large, medium, and small sized 60°/30° right triangles into the large, medium, and small sized holding trays. Of course various other sized triangular blocks and holding trays are also envisioned.

By utilizing the various colors of the triangle blocks, different symmetrical shapes can be created, such as mirror images and rotational images. Additionally, by using the various sized 60°/30° right triangles in the various different holding trays, a pattern of fractions emerges for the user to learn. Illustrative of this point is when the user takes two of the same sized holding trays and places small and medium sized 60°/30° right triangles separately therein. If the user places four medium sized 60°/30° right triangles in a medium holding tray and twelve small sized 60°/30° right triangles in a second medium holder a fractional relationship emerges, whereby the first filled holding tray is equivalent to four eights and the second holding tray is equivalent to twelve twenty-fourths—e.g., all equal to one half, or the size of the medium holding tray in relation to the large holding tray. This fractional relationship holds true for every sized holding tray and 60°/30° right triangle combination.

BRIEF DESCRIPTION OF THE DRAWINGS

The present invention is further described in the detailed description that follows, by reference to a plurality of drawings by way of a non-limiting exemplary embodiment of the present invention, like reference numerals in the drawings representing similar parts throughout the several views of the same, and wherein.

DETAILED DESCRIPTION OF THE INVENTION

The present invention is a puzzle game designed to teach children as well as adults mathematical and geometric recognition skills so that they may effectively compute various mathematical equations, and most importantly, understand and use fractions, and other complex mathematical concepts, such as geometry and trigonometry. The dimensions of the puzzle game, including the 60°/30° right triangles, holding trays, colors, and other variables and quantities specified herein may vary with the type of puzzle game contemplated for use with the present invention. Therefore, numbers and dimensions specified herein are not to be construed as limitations on the scope of the present invention but are meant to be merely illustrative of one particular application. For example, it is contemplated that a large holding tray be able to accommodate any number of combinations of large, medium, or small 60°/30° right triangles or other triangles. Additionally, it is also envisioned that the present invention comprise several graduated sizes of 60°/30° right triangles and holding trays, other than the large, medium and small 60°/30° right triangles and holding trays that are mentioned throughout the instant specification.

Further, the detailed description of the present invention is also based on a method of teaching children and adults mathematical and geometric recognition skills utilizing the present invention as specified herein. Therefore, methods specified herein are not to be construed as limitations on the scope of the present invention but are meant to be merely illustrative of one particular application. For example, it is contemplated that an instructor will request a participant to combine several combinations of graduated sizes of 60°/30° right triangles to form a fraction of a holding tray or, in the alternative, to form a certain geometric pattern utilizing the colored graduated sizes of 60°/30° right triangles.

Figure 1:
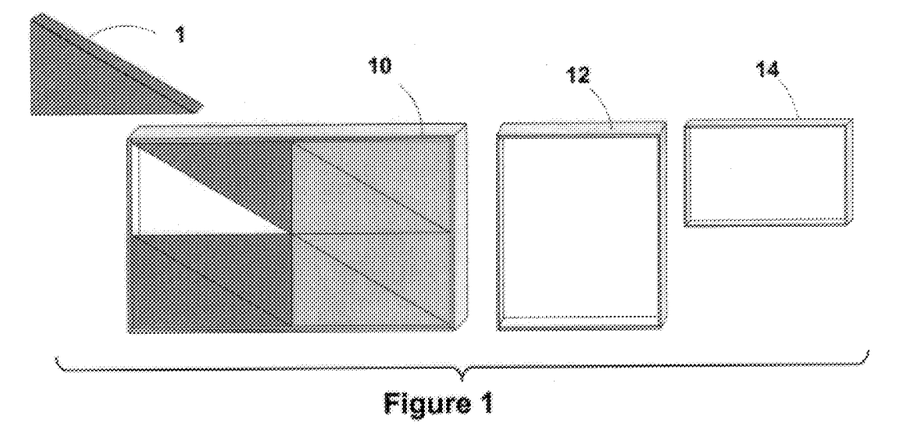
FIG. 1 shows a detailed isometric view of a set of large, medium, and small holding trays utilizing large 60°/30° right triangles.

FIG. 1 shows a first set of large, medium, and small holding trays, 10, 12, and 14 respectively, and a plurality of large 60°/30° right triangles 1. In the preferred embodiment eight large 60°/30° right triangles 1 are placed within the large holding tray 10 until the large holding tray 10 is full. The eight large 60°/30° right triangles 1 are arranged so that they form four rectangular shapes. The four rectangular shapes are thereafter placed side-by-side within the large holding tray 10 until the large holding tray 10 is full. As shown in FIG. 1 the four rectangular shapes are paired so that one large rectangular shape is formed. In alternate embodiments, the rectangles are placed side-by-side abutting the larger legs of one another to fill the holding tray 10.

Also shown in FIG. 1 is a first medium holding tray 12 and a first small holding tray 14, wherein in the preferred embodiment the first medium holding tray 12 is half the size of the large holding tray 10 and the first small holding tray 14 is one fourth the size of the large holding tray 10. As such, the first medium holding tray 12 accommodates four large 60°/30° right triangles 1 and the first small holding tray 14 accommodates two large 60°/30° right triangles 1. As mentioned above, the configuration of the large 60°/30° right triangles 1 can be arranged in a plurality of manners.

Utilizing the above relationships between the large holding tray 10, first medium holding tray 12, and first small holding tray 14 a participant can observe the use of fractions and multiplication and other mathematical relations. By way of example, the participant can multiply the contents of the first medium holding tray 12 by the number two to arrive at the number of large 60°/30° right triangles 1 accommodating the large holding tray 1, or in the alternative, divide the contents of the first medium holding tray 12 by the number two to arrive at the number of large 60°/30° right triangles 1 accommodating the small holding tray 14. Additionally, the participant can also add or subtract the contents of the first medium holding tray 12 to arrive at the number of large 60°/30° right triangles 1 accommodating the large holding tray 1, or in the alternative, the first small holding tray 14, respectively. The participant can also appreciate the fractional ratios between the large holding tray 1, medium holding tray 12, and first small holding tray 14, to wit one, one half and one fourth, respectively.

Alternate embodiments of the present invention envision different holding trays and large 60°/30° right triangle 1 and other triangle sizes. As way of example the large holding tray 10 can be enlarged so as to accommodate ten, twelve, fourteen, etc. large 60°/30° right triangles 1.

Figure 2:
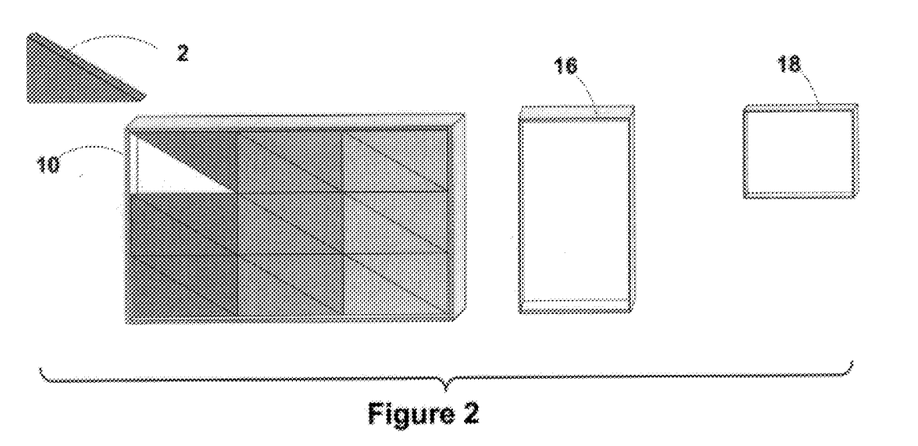
FIG. 2 shows a detailed isometric view of a set of large, medium, and small holding trays utilizing medium 60°/30° right triangles.

Referring now to FIG. 2 a second set of large, medium, and small holding trays, 10, 16, and 18, respectively, and a plurality of medium 60°/30° right triangles 2 are taught. In the preferred embodiment, sixteen medium 60°/30° right triangles 2 are placed within the large holding tray 10 until the large holding tray 10 is full. The sixteen medium 60°/30° right triangles 2 are arranged so that eight rectangular shapes are formed. The eight rectangular shapes are thereafter placed side-by-side within the large holding tray 10 until the holding tray 10 is full. As shown in the preferred embodiment the eight rectangular shapes are paired so that one large rectangular shape is formed.

FIG. 2 also shows a second medium holding tray 16 and small holding tray 18, wherein the second medium holding tray 16 is one third the size of the large holding tray 10 and the second small holding tray 18 is one ninth the size of the large holding tray 10. In the preferred embodiment, the second medium holding tray 16 accommodates six medium 60°/30° right triangles 2 and the second small holding tray 12 accommodates two medium 60°/30° right triangles 2.

Utilizing the above relationships between the large holding tray 10, second medium holding tray 16, and second small holding tray 18 a participant can observe the use of fractions, multiplication, and other mathematical relations. By way of example, the participant can multiply the contents of the second medium holding tray 16 by the number three to arrive at the number of medium 60°/30° right triangles 2 accommodating the large holding tray 1, or in the alternative, divide the contents of the second medium holding tray 16 by the number three to arrive at the number of medium 60°/30° right triangles 2 accommodating the second small holding tray 18. Additionally, the participant can also add or subtract the contents of the second medium holding tray 16 to arrive at the number of medium 60°/30° right triangles 2 accommodating the large holding tray 1, or in the alternative, the second small holding tray 18, respectively. The participant can also appreciate the fractional ratios between the large holding tray 1, medium holding tray 16, and small holding tray 18, to wit one, one third and one ninth, respectively.

Alternate embodiments of the present invention envision different holding trays and medium 60°/30° right triangle 2 and other triangle sizes. As way of example the large holding tray 10 can be enlarged so as to accommodate twenty-four, thirty, thirty-six, etc. medium 60°/30° right triangles 2.

Figure 3:
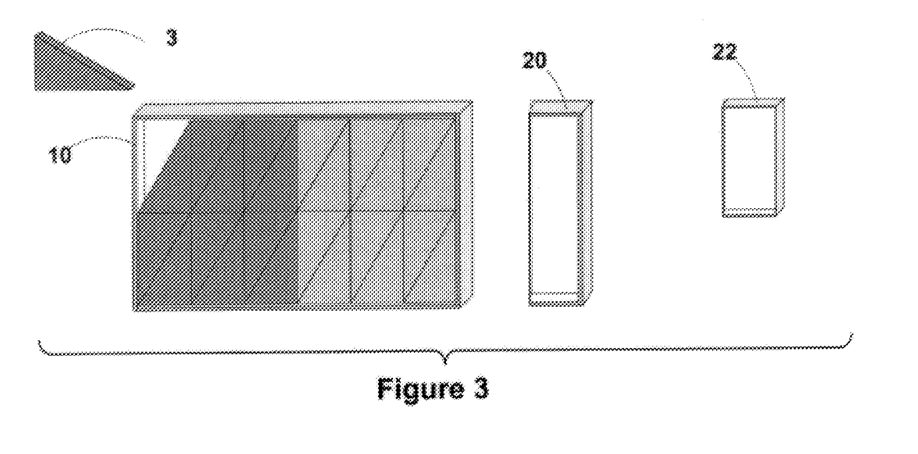
FIG. 3 shows a detailed isometric view of a set of large, medium, and small holding trays utilizing small 60°/30° right triangles.

Referring now to FIG. 3 a third set of large, medium, and small holding trays, 10, 20, and 22, respectively, and a plurality of small 60°/30° right triangles 3 are shown. In the preferred embodiment, twenty-four small 60°/30° right triangles 3 are placed within the large holding tray 10 until the large holding tray 10 is full. The twenty-four small 60°/30° right triangles 3 are arranged so that twelve rectangular shapes are formed. The twelve rectangular shapes are thereafter placed side-by-side within the large holding tray 10 until the large holding tray 10 is full. As shown in FIG. 3 the twelve rectangular shapes are paired so that one large rectangular shape is formed. The configuration of the small 60°/30° right triangles 3 can be arranged in a plurality of manners.

FIG. 3 also shows a third medium holding tray 20 and small holding tray 22. In the preferred embodiment the third medium holding tray 20 is one sixth the size of the large holding tray 10 and the third small holding tray 22 is one twelfth the size of the large holding tray 10. As such, the second medium holding tray 16 accommodates four small 60°/30° right triangles 3 and the third small holding tray 22 accommodates two small 60°/30° right triangles 3.

Utilizing the above relationships between the large holding tray 10, third medium holding tray 20, and third small holding tray 22 a participant can observe the use of fractions, multiplication, and other mathematical relations. By way of example, the participant can multiply the contents of the third medium holding tray 20 by the number six to arrive at the number of small 60°/30° right triangles 3 accommodating the large holding tray 1, or in the alternative, divide the contents of the third medium holding tray 22 by the number six to arrive at the number of small 60°/30° right triangles 3 accommodating the third small holding tray 22. Additionally, the participant can also add or subtract the contents of the second medium holding tray 20 to arrive at the number of small 60°/30° right triangles 3 accommodating the large holding tray 1, or in the alternative, the third small holding tray 22, respectively. The participant can also appreciate the fractional ratios between the large holding tray 1, third medium holding tray 20, and third small holding tray 22, to wit one, one sixth and one twelfth, respectively.

Alternate embodiments of the present invention envision different holding tray and small 60°/30° right triangle 3 and other triangle sizes. As way of example the large holding tray 10 can be enlarged so as to accommodate twenty-eight, thirty-two, thirty-six, etc. small 60°/30° right triangles 3.

By way of further examples, the use of the large 60°/30° right triangles 1, medium 60°/30° right triangles 2, and small 60°/30° right triangles 3 can be manipulated to teach addition, subtraction, division, multiplication, geometry, and trigonometry. To Illustrate the use of addition a participant can add the large 60°/30° right triangles 1 that fill two of the first medium holding tray 12 to arrive at the exact number of large 60°/30° right triangles 1 that fill the large holding tray 10. Illustrative of the use of multiplication is the relationship between the large 60°/30° right triangles 1 and the first set of large, medium, and small holding trays, 10,,12, and 14 respectively. In particular, the large holding tray 10 is two times as large as the first medium holding tray 12 and four times as large as the first small holding tray 14. This being the case, the participant must realize, and ultimately, calculate that there are two times the amount of large 60°/30° right triangles 1 that can fit into the large holding tray 10 as in the medium tray 12. Additionally, utilizing certain relationships between the large, medium, and small 60°/30° right triangles, 1, 2, and 3 trigonometry and geometry can also be taught utilizing the present invention which is explained in greater detail below.

Referring to FIGS. 4–11 fractional equivalents of certain sized holding trays utilizing large, medium, and small 60°/30° right triangles, 1, 2, and 3, respectively, are taught. In particular, the use of certain sized holding trays in combination with large, medium, and small 60°/30° right triangles, 1, 2, and 3 respectively, enables the participant to further understand the concepts of fractions and how they are used by calculating equivalent fractions, e.g., one half equals four eighths.

By way of example, if the user places four medium sized 60°/30° right triangles in a medium holding tray a fractional relationship emerges, whereby the filled holding tray is equivalent to four eighths—e.g., all equal to one half, or the size of the medium holding tray in relation to the large holding tray. In other words, the participant must recognize that the first medium holding tray 12 is one half the size of the large holding tray 10 and, as such, the participant must calculate the equivalent of one half utilizing the number four as the numerator of the new fraction (coinciding with the number of large 60°/30° right triangles 1 utilized in the holding tray) to be solved. To equate the new fraction to one half, the participant must determine the denominator of the new fraction by cross multiplying the numerator of the unknown fraction by the denominator of the known fraction (e.g., one half), to wit, multiplying four (in the case of the use of large 60°/30° right triangles 1) by two to obtain eight. Once the denominator is equated, the participant has successfully accomplished the understanding and use of fractions as well as the use of multiplication and division. Alternate embodiments of the present invention utilize other size holding trays that are fractional sizes of any other size holding tray. Different sizes of 60°/30° right triangles or other triangles are also envisioned. Thus, a person having ordinary skill in the art of mathematical puzzle games would contemplate the use of rectangles, squares, triangles (isosceles, equilateral, 45° triangles, etc.), and many other geometrically shaped holding trays and blocks for use in the present invention.

Figure 4:
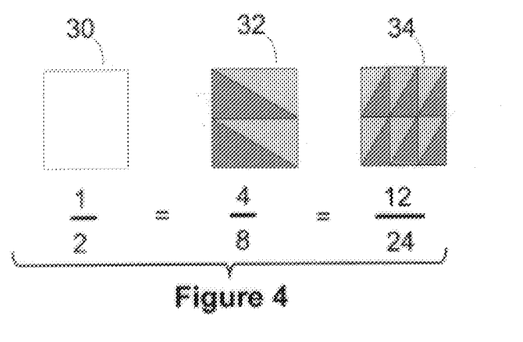
FIG. 4 shows a plan view of fractional equivalents of a certain sized tray utilizing 60°/30° right triangles.

FIG. 4 shows an empty one half holding tray 30, a holding tray 32 filled with 60°/30° right triangles, and a holding tray 34 filled with smaller 60°/30° right triangles. In this representation, four 60°/30° right triangles are placed within the holding tray 32 and twelve smaller 60°/30° right triangles are placed within the holding tray 34, wherein the holding tray 32 represents the fraction four eights and the holding tray 34 represents the fraction twelve twenty-fourths, e.g., equivalent to the one half holding tray 30.

Figure 5:
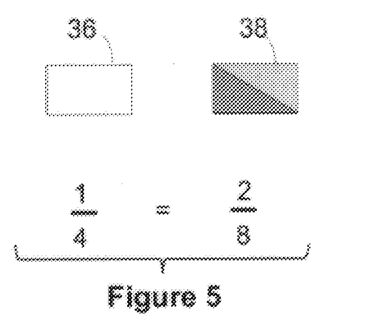
FIG. 5 shows a plan view of fractional equivalents of a certain sized tray utilizing 60°/30° right triangles.

FIG. 5 shows an empty one fourth holding tray 36 and a holding tray 38 filled with two 60°/30° right triangles. In this illustration the holding tray 38 represents the fraction two eighths, e.g., equivalent to the one quarter holding tray 36.

Figure 6:
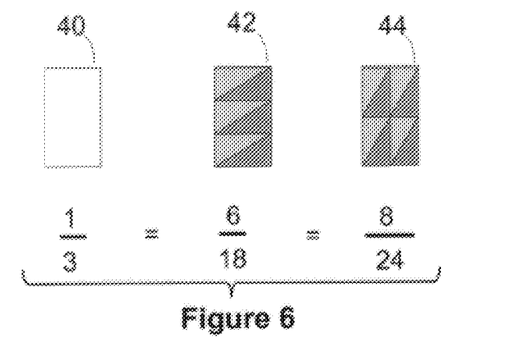
FIG. 6 shows a plan view of fractional equivalents of a certain sized tray utilizing a set of 60°/30° right triangles.

FIG. 6 shows an empty one third holding tray 40, a holding tray 42 filled with 60°/30° right triangles, and a holding tray 44 filled with smaller 60°/30° right triangles. In this illustration, six 60°/30° right triangles are placed within the holding tray 42 and eight smaller 60°/30° right triangles are placed within the holding tray 44, wherein the holding tray 42 represents the fraction six-eighteenths and the holding tray 44 represents the fraction eight twenty-fourths, e.g., equivalent to the one third holding tray 40.

Figure 7:
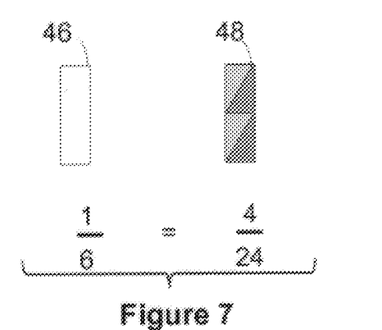
FIG. 7 shows a plan view of fractional equivalents of a certain sized tray utilizing 60°/30° right triangles.

FIG. 7 shows an empty one sixth holding tray 46 and a holding tray 48 filled with four 60°/30° right triangles. In this illustration the holding tray 48 represents the fraction four twenty-fourths, e.g., equivalent to the one sixth holding tray 36.

Figure 8:
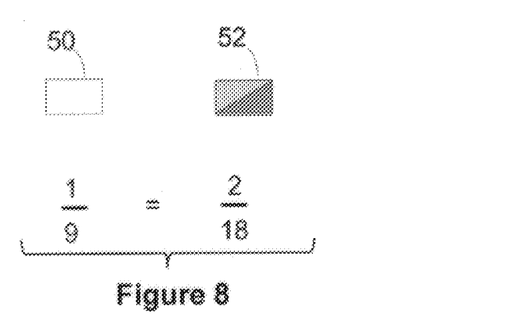
FIG. 8 shows a plan view of fractional equivalents of a certain sized tray utilizing 60°/30° right triangles.

FIG. 8 shows an empty one ninth holding tray 50 and a holding tray 52 filled with two 60°/30° right triangles. In this illustration the holding tray 52 represents the fraction two eighteenths, e.g., equivalent to the one ninth holding tray 50.

Figure 9:
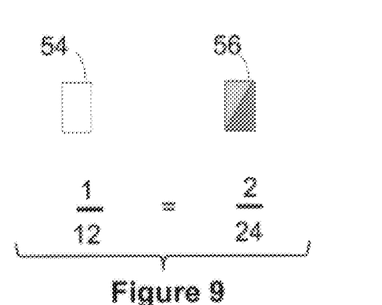
FIG. 9 shows a plan view of fractional equivalents of a certain sized tray utilizing 60°/30° right triangles.

FIG. 9 shows an empty one twelfth holding tray 54 and a holding tray 56 filled with two 60°/30° right triangles. In this illustration the holding tray 56 represents the fraction two twenty-fourths, e.g., equivalent to the one twelfth holding tray 54.

Figure 10:
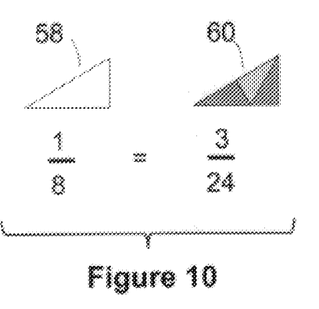
FIG. 10 shows a plan view of fractional equivalents of a certain sized tray utilizing 60°/30° right triangles.

FIG. 10 shows an empty one eighth triangular holding tray 58 and a holding tray 60 filled with three 60°/30° right triangles. In this illustration the holding tray 60 represents the fraction three twenty-fourths, e.g., equivalent to the one eighth holding tray 36.

Figure 11:
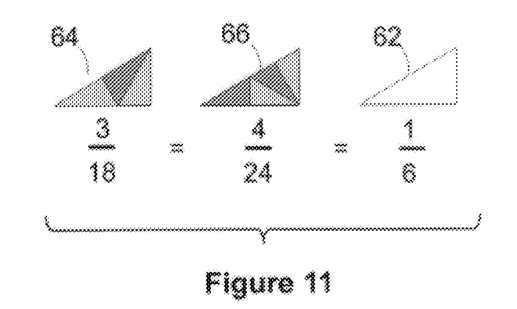
FIG. 11 shows a plan view of a set of fractional equivalents of a certain sized tray utilizing 60°/30° right triangles.

FIG. 11 shows an empty one sixth triangular shaped holding tray 62, a triangular shaped holding tray 64 filled with 60°/30° right triangles, and a holding tray 66 filled with smaller 60°/30° right triangles. In this representation, three 60°/30° right triangles are placed within the triangular shaped holding tray 64 and four smaller 60°/30° right triangles are placed within the triangular shaped holding tray 66, wherein the triangular shaped holding tray 64 represents the fraction three eighteenths and the triangular shaped holding tray 66 represents the fraction four twenty-fourths, e.g., equivalent to the one sixth holding tray 62.

FIGS. 4–11 are a mere representative set of holding trays and 60°/30° right triangles that are envisioned with the present invention. It is contemplated that alternate embodiments will utilize several other fractions, such as one tenth, one eighteenth, etc. and other triangles and holding trays, when teaching the concept of fractions, multiplication, and other mathematical and geometric recognition skills.

In accordance with the present invention, the teaching of geometric relationships is also envisioned. Accordingly, FIGS. 12–16 teach the participant geometric relations utilizing various colored and sized 60°/30° right triangles. In particular, FIGS. 12–16 represent geometric relations in which the participant is asked to recognize and/or devise. For instance, the participant may be asked to form a diamond shape or an inverse mirror image utilizing various colored 60°/30° right triangles. In order to accomplish these tasks, the participant manipulates the colored 60°/30° right triangles until the required task is accomplished. The geometric relationships between the colored 60°/30° right triangles that the participant forms are infinite.

Figure 12:
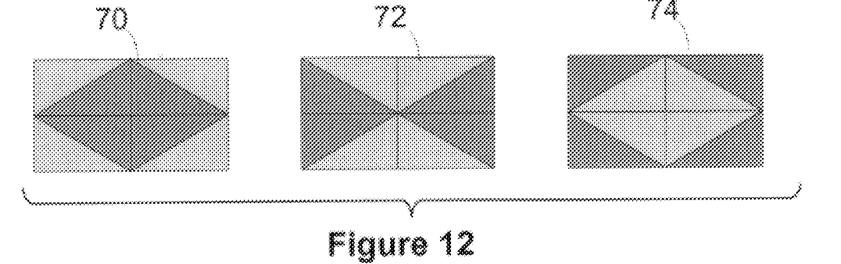
FIG. 12 shows a plan view of a set of large 60°/30° right triangles arranged in rotational symmetry.

Referring to FIG. 12 a set of colored 60°/30° right triangles arranged in rotational symmetry—i.e., the 60°/30° right triangles look the same when they are rotated 180°—is shown. Specifically, holding trays 70 and 74 show a diamond shaped pattern formed from the colored 60°/30° right triangles, whereby the diamond pattern is a different color than the surrounding 60°/30° right triangles. Holding tray 72 depicts four isosceles triangles formed from eight colored 60°/30° right triangles, wherein facing isosceles triangles are of the same color and size. Alternate embodiments of the present invention comprising several different combinations of colors and sizes of 60°/30° right triangles arranged in rotational symmetry so that an infinite number of rotational geometric shapes can be formed and recognized by the participant.

Figure 13:
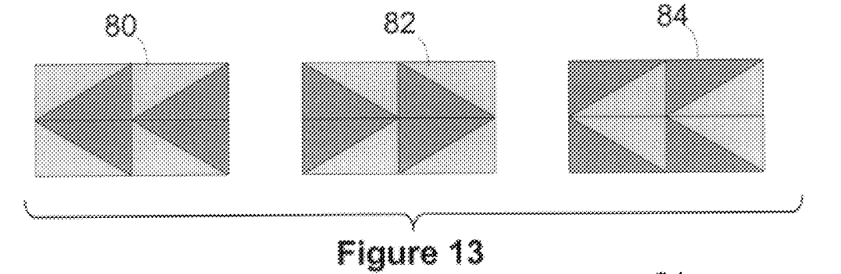
FIG. 13 shows a plan view of a set of 60°/30° right triangles arranged in mirror symmetry with respect to a vertical mirror.

FIG. 13 shows a set of colored 60°/30° right triangles arranged in mirror symmetry with respect to a vertical mirror. In particular, holding trays 80, 82, and 84 show a set of colored 60°/30° right triangles forming a plurality of isosceles triangles. When the holding trays 80, 82, and 84 are vertically bisected in half, two isosceles triangles forming mirror images of one another appear in each holding tray. It is contemplated that the isosceles triangles face in either the right or left direction depending on the preference of the user and/or the instructor. Alternate embodiments of the present invention comprising several different combinations of colors and sizes of 60°/30° right triangles arranged in mirror image symmetry so that an infinite number of geometric mirror image shapes can be formed and identified by the participant are contemplated.

Figure 14:
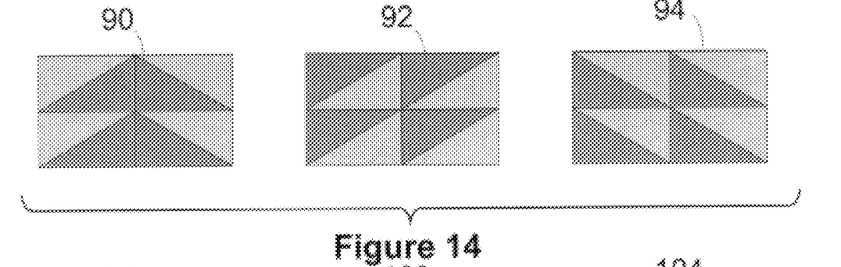
FIG. 14 shows a plan view of a set of large 60°/30° right triangles arranged in mirror symmetry with respect to a horizontal mirror.

FIG. 14 shows a set of colored 60°/30° right triangles arranged in mirror symmetry with respect to a horizontal mirror. Specifically, holding tray 90 shows a set of colored 60°/30° right triangles forming a plurality of isosceles triangles. When the holding tray 90 is horizontally bisected in half, two isosceles triangles facing the same direction and forming mirror images of one another appear. It is contemplated that the isosceles triangles face in either the upward or downward direction depending on the preference of the user and/or the instructor. Holding trays 92, 94, and 96 show alternative mirror image patterns. Alternate embodiments of the present invention comprising several different combinations of colors and sizes of 60°/30° right triangles arranged in mirror image symmetry so that an infinite number of geometric mirror image shapes can be formed and identified by the participant are contemplated.

Figure 15:
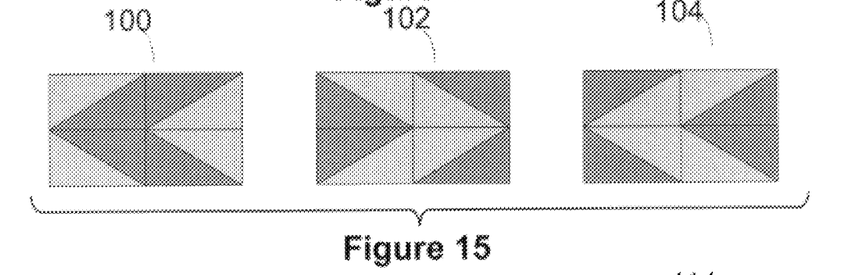
FIG. 15 shows a plan view of a set of 60°/30° right triangles arranged so that the right half is a negative image of the left half.

FIG. 15 shows a set of colored 60°/30° right triangles arranged so that the right half of the holding tray is a negative image of the left half of the holding tray. Specifically, holding trays 100, 102, and 104 show a set of colored 60°/30° right triangles forming a plurality of isosceles triangles. When the holding trays 100, 102, and 104 are horizontally bisected in half, two isosceles triangles of inverse color relation (i.e. black and white, orange and red, etc.) facing the same direction and forming mirror images of one another appear. In the preferred embodiment, the color of the first isosceles triangle is the same as the color of the surrounding 60°/30° right triangles of the rear isosceles triangle and the color of the rear isosceles triangle is the same color as the surrounding 60°/30° right triangles of the front isosceles triangles. Alternate embodiments of the present invention comprising several different combinations of colors and sizes of 60°/30° right triangles arranged in negative image symmetry so that an infinite number of geometric negative image shapes can be formed and identified by the participant are contemplated.

Figure 16:
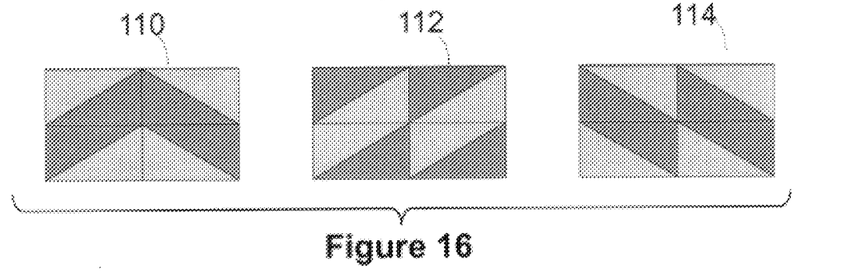
FIG. 16 shows a plan view of a set of 60°/30° right triangles arranged so that the lower half is a negative image of the upper half.

FIG. 16 shows a set of colored 60°/30° right triangles arranged so that the lower half of the holding tray is a negative image of the upper half of the holding tray. Specifically, holding tray 110 shows a set of colored 60°/30° right triangles forming a plurality of isosceles triangles. When the holding tray 110 is vertically bisected in half, two isosceles triangles of inverse color relation (i.e., black and white, orange and red, etc) facing the same direction and forming mirror images of one another appear.

Alternate embodiments of the present invention include holding trays 112, 114, and 116. Alternate embodiments of the present invention comprising several different combinations of colors and sizes of 60°/30° right triangles arranged in negative image symmetry so that an infinite number of geometric negative image shapes can be formed and identified by the participant.

Figure 17:
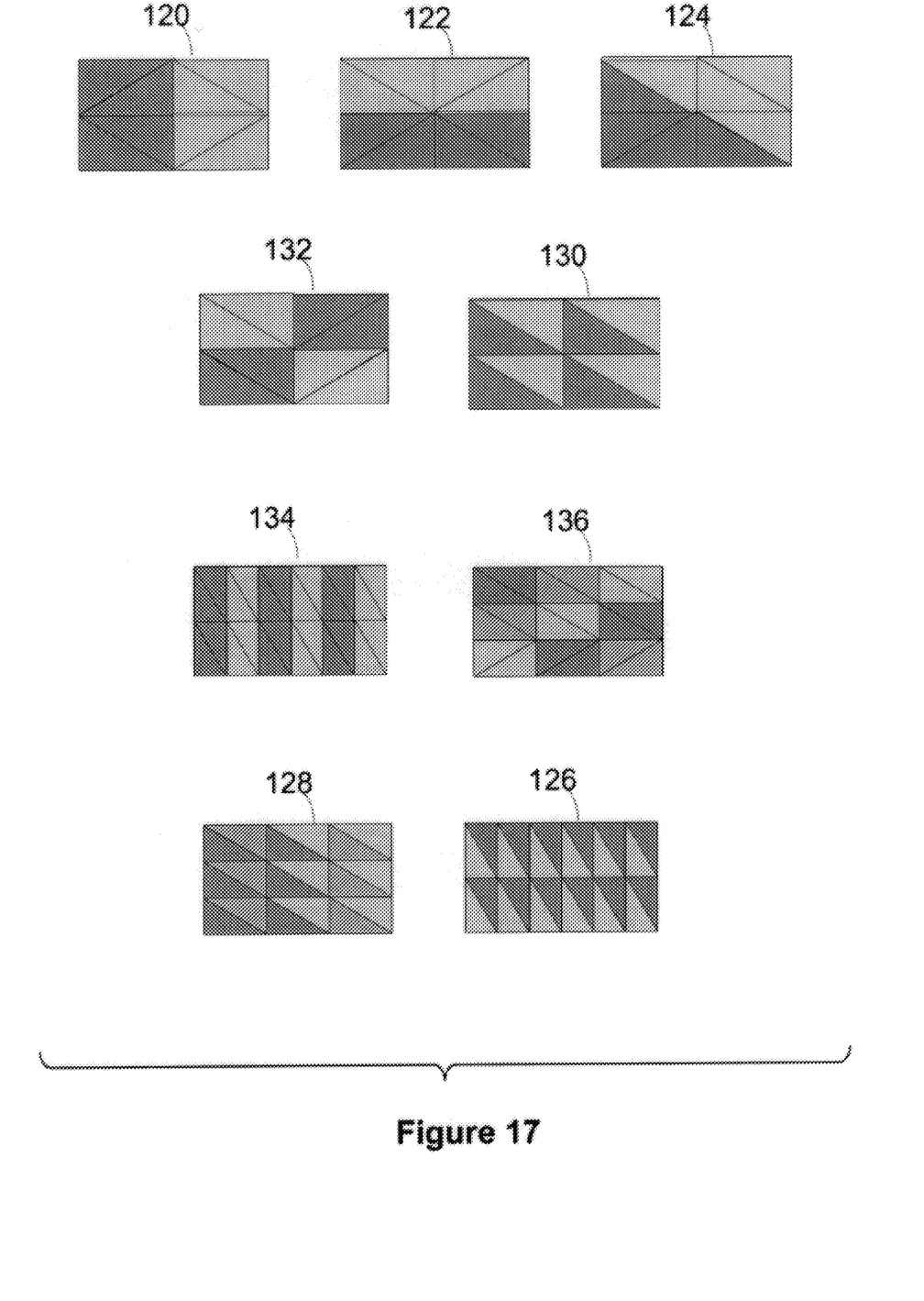
FIG. 17 shows a plan view of a set of 60°/30° right triangles patterned to show specific fractions.

FIG. 17 shows a set of colored 60°/30° right triangles arranged showing patterns of specific fractions. These patterns teach the participant fractions by allowing the participant to recognize the relationships between the colored 60°/30° right triangles. For instance, holding trays 120, 122, and 124 show patterns depicting the fraction one half. The present invention also permits the user to form other fractional equivalents by manipulating the colored 60°/30° right triangles in other patterns. The following holding trays depict the following other fractional equivalents that the participant may form: 1)holding tray 126 depicts the fraction one twenty-fourth; 2) holding tray 128 depicts the fraction one eighteenth; 3) holding tray 130 depicts the fraction one eighth; 4) holding tray 132 depicts the fraction one fourth; 5) holding tray 134 depicts the fraction one twelfth; and 6) holding tray 136 depicts the fraction one ninth. Alternate embodiments utilizing various sized holding trays and 60°/

30° right triangles and other triangles to pattern an infinite number of fractional equivalents are also envisioned.

As seen from the above description, mathematical skills, such as fractions, multiplication, and the like, as well as geometric relations are taught. Now referring to FIG. 18–20 trigonometry, geometry, and algebra, are also taught utilizing the concepts of the present invention. Specifically, the participant can manipulate the 60°/30° right triangles in order to calculate certain properties of the small, medium, and large 60°/30° right triangles, e.g., angles and leg lengths. By way of example, the participant places the 60°/30° right triangles against one another to determine the relationships between the lengths of the respective legs of each of the 60°/30° right triangles, or the participant creates a large 60°/30° right triangle and determines the angles and leg lengths thereof by manipulating the small, medium, and large 60°/30° right triangles in certain manners. This being the case, the participant learns geometry and trigonometry by manipulating a set of at least two 60°/30° right triangles, e.g., small, medium, and/or large 60°/30° right triangles.

Figure 18:
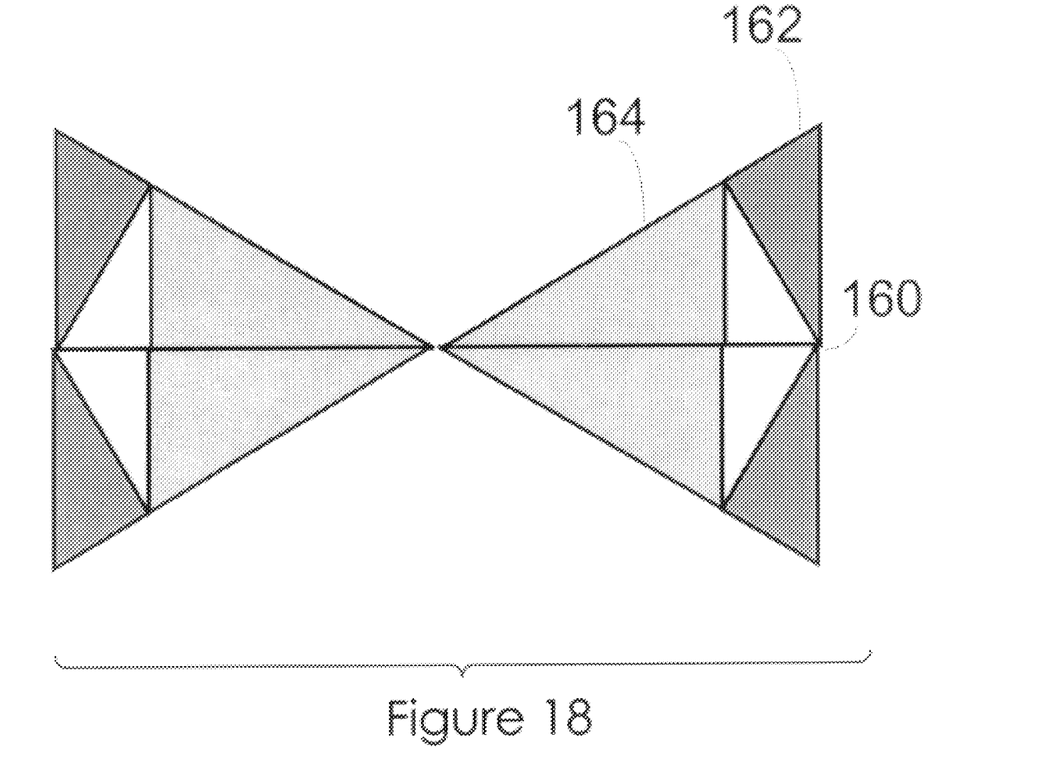
FIG. 18 shows four sets of various sized 60°/30° right triangles patterned to trigonometric relations.

FIG. 18 shows a preferred embodiment of the present invention, wherein four sets of various sized 60°/30° right triangles patterned to form a geometric and trigonometrical relation are shown. Particularly, graph 150 comprises four sets of three 60°/30° right triangles, wherein the set of three 60°/30° right triangles comprise a large, medium and small 60°/30° right triangle, 160, 162, and 164, respectively. According to FIG. 20(the preferred embodiment), the relationships between the three 60°/30° right triangles are as follows: 1) the small 60°/30° right triangle 160 comprises a short leg of "b" long leg of "a", and a hypotenuse "2b"; 2) the medium 60°/30° right triangle 162 comprises a short leg of "2a/3", a long leg of "2b", and a hypotenuse "4a/3", and 3) the large 60°/30° right triangle 164 comprises a short leg of "a", a long leg of "3b", and a hypotenuse "2a." Permitting the participant to employ algebraic mathematics the relationship "$a=(3)^{1/2}b$" is found. Utilizing this relations it becomes apparent that the long leg "a" of the small 60°/30° right triangle 160 is equal to the short leg "a" of the large 60°/30° right triangle 164, and the hypotenuse "2b" of the small 60°/30° right triangle 160 is equal to the long leg "2b" of the medium 60°/30° right triangle 162. Pursuant to this relation a larger 60°/30° right triangle with the same properties of the constituent triangles is formed by allowing the participant to abut the long leg "a" of the small 60°/30° right triangle 160 against the short leg "a" of the large 60°/30° right triangle 164, and the hypotenuse "2b" of the small 60°/30° right triangle 160 against the long leg "2b" of the medium 60°/30° right triangle 162.

Figure 19:
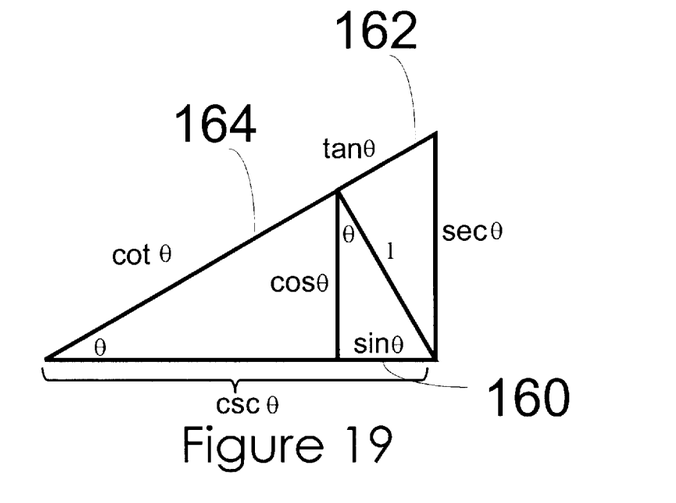
FIG. 19 shows certain properties of a small, medium, and large 60°/30° right triangles.
Figure 20:
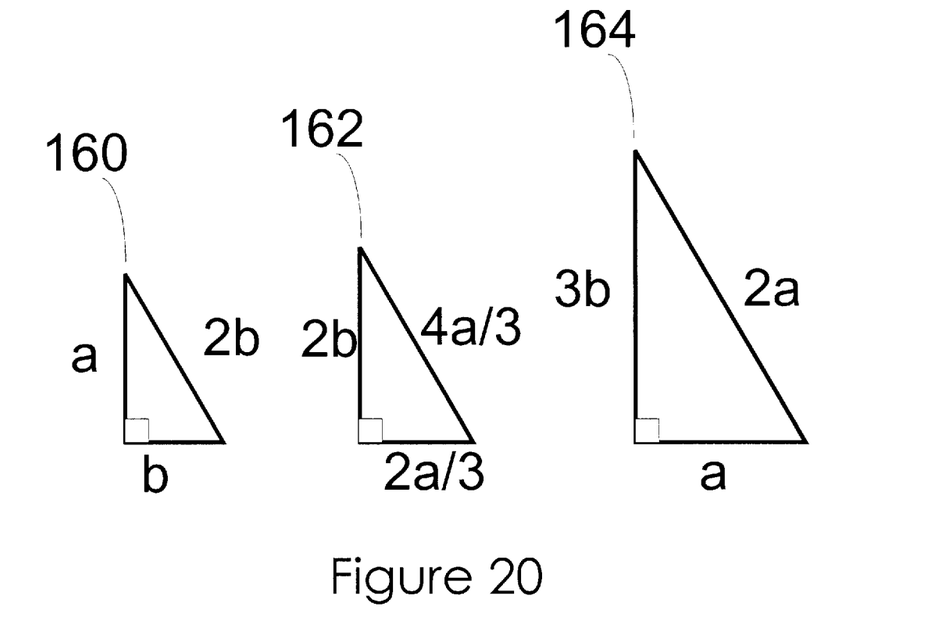
FIG. 20 shows an enlarged section of FIG. 18 across the line 18—18.

In accordance with FIG. 19 the following properties are calculated by the participant using trigonometric relations (assuming the 30° angle of the small 60°/30° right triangle 160 is equivalent to θ and the hypotenuse is equivalent to one unit). 1) the small 60°/30° right triangle 160 comprises a short leg equal to "sin θ" and a long leg equal to "cos θ"; 2) the medium 60°/30° right triangle 162 comprises a short leg equal to "tan θ", a long leg equal to "1" (equivalent to the hypotenuse of the small 60°/30° right triangle 160), and a hypotenuse equal to "sec θ"; and 3) the large 60°/30° right triangle 164 comprises a short leg equal to "cos θ" (equivalent to the long leg of the small 60°/30° right triangle 160), and a hypotenuse equal to "cotan θ." The combination of the long leg of the large 60°/30° right triangle 164 and the short leg of the small 60°/30° right triangle 160 is equivalent to "cosec θ." These and other combinations and relationships can be calculated by the participant. Illustrative of this point is the relationship between the angles of the four sets of three 60°/30° right triangles of graph 150. Alternate embodiments envision the use of at least two, and preferably three sets of 45° right triangles as well.

Figure 21:
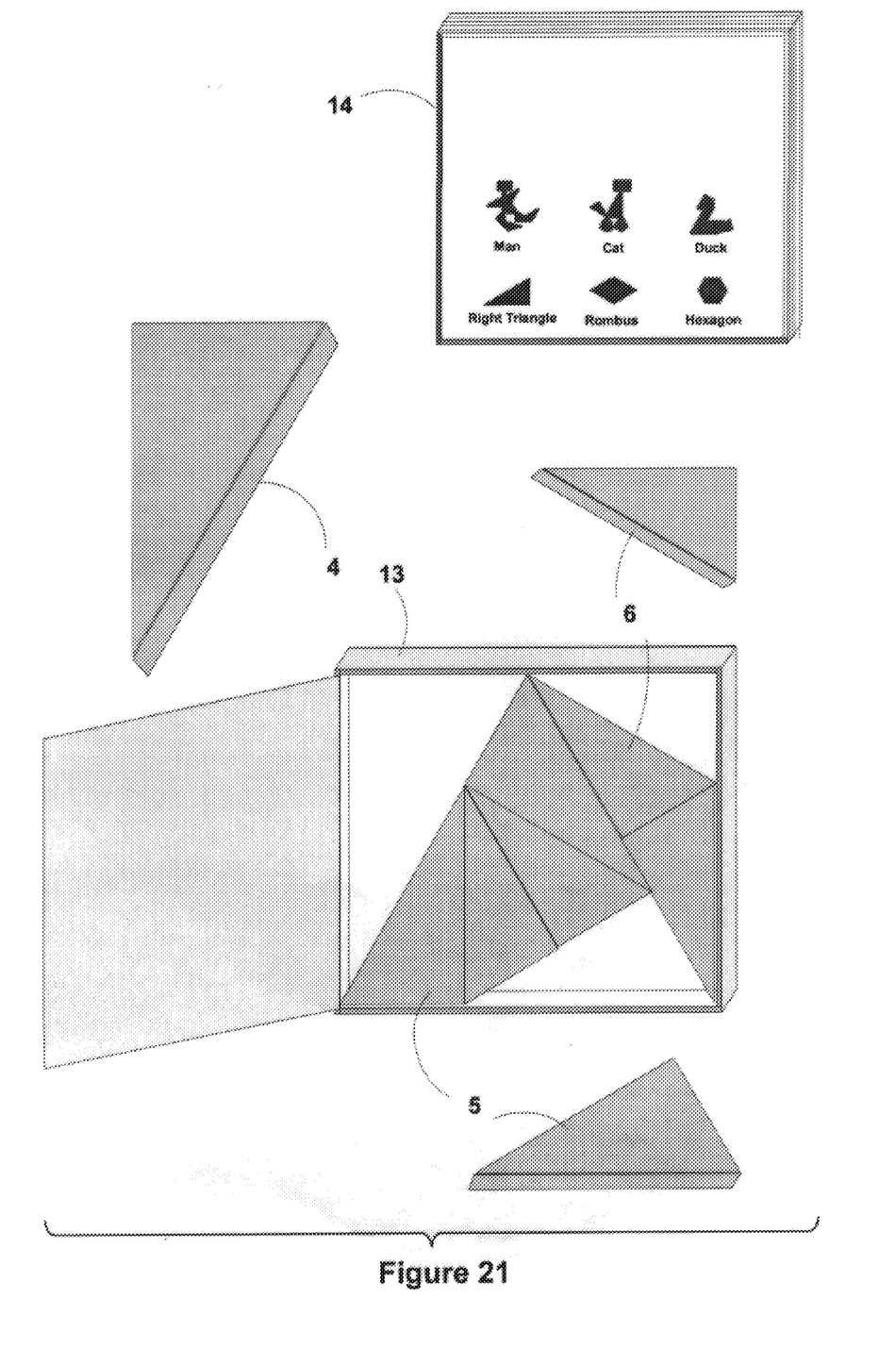
FIG. 21 shows detailed isometric views of the elements of the Trigram Puzzle set of material consisting of 1 large, 3 medium and 5 small triangles.

Also another preferred embodiment is show in FIG. 21. This embodiment consists of one large 1 and three medium 2 and five small 3 triangles arranged in a rectangular box 166. This kit is used to make puzzle shapes from a booklet 168 that is included with the puzzle. This kit can also be used for exploring trigonometric concepts as discussed before.

Figure 22:
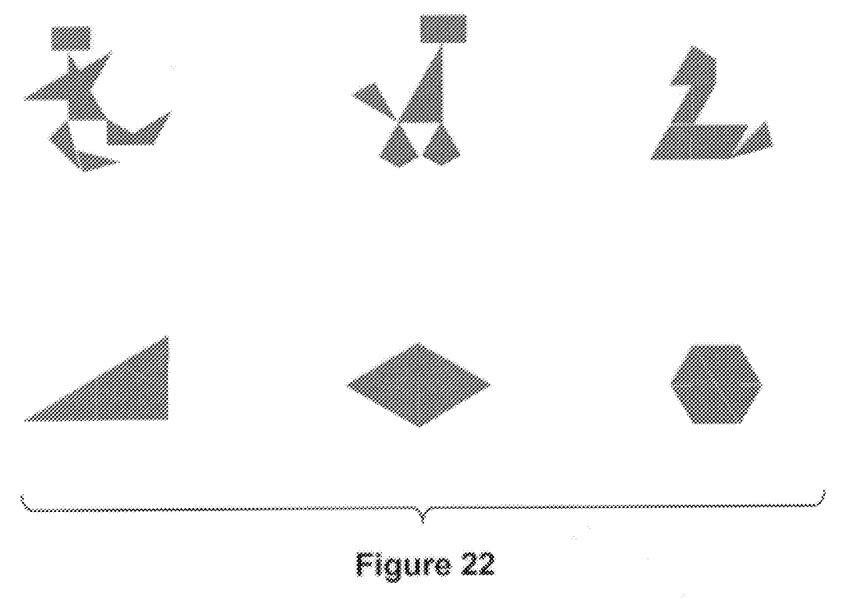
FIG. 22 Shows six designs that can be made with the Trigram puzzle pieces.

FIG. 22 shows three non-geometric and three geometric puzzles shapes that can be made with the Trigram puzzle. There are thousands of these shapes possible.

Figure 23:
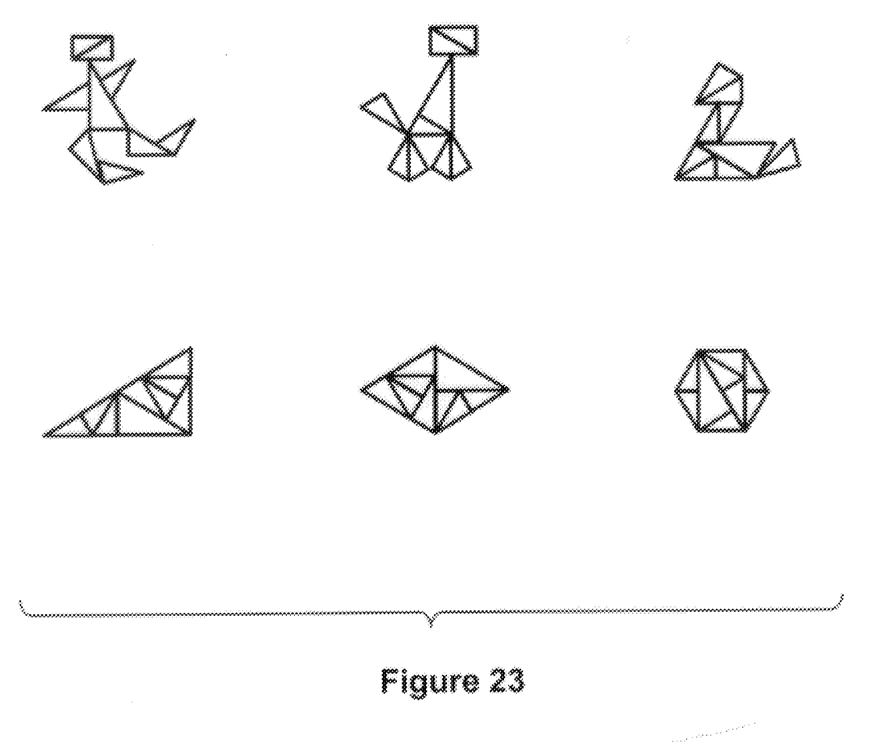
FIG. 23 Shows the solutions for the puzzles in FIG. 22.

FIG. 23 shows the solution of the three non-geometric and the three geometric puzzles in FIG. 22.

Preferred and alternate embodiments of the present invention have now been described in detail. It is to be noted, however, that the description of the above embodiments are merely illustrative of the principles underlying the inventive concept. It is therefore contemplated that various modifications of the disclosed embodiments will, without departing from the spirit and scope of the invention, be apparent to persons of ordinary skill in the art. In particular it is envisioned that the above referenced puzzle game be modified to include any combination and sizes of right triangles and holding trays as well as various colored right triangles.

I claim:

1. A mathematical triangle kit for teaching mathematical and geometric relation skills, comprising:

a. at least one small manipulative element, wherein the small manipulative element is a right triangle with base angles of 30° and 60°;

at least one medium manipulative element, wherein the medium manipulative element is a right triangle with base angles of 30° and 60°; and c. at least one large manipulative element, wherein the large manipulative element is a right triangle with base angles of 30° and 60°;

wherein a side opposite of the 60° angle of the small manipulative element is equal to a side opposite of the 30° angle of the large manipulative element; and wherein the hypotenuse of the small manipulative element is equal to a side opposite of the 60° angle of the medium manipulative element.

2. A mathematical triangle kit of claim 1 further comprising at least one holiday tray, wherein the holding tray is at least a small, medium or large holding tray.

3. A mathematical triangle kit of claim 2 wherein the holding tray accommodates a combination of the small, medium, and large manipulative elements.

4. A mathematical triangle kit of claim 2 wherein the small, medium, and large manipulative elements fit exactly with the at least one holding tray.

5. A mathematical triangle kit of claim 2 wherein the small, medium, and large manipulative elements comprise various colors.

6. A mathematical triangle kit of claim 5 wherein the various colored small, medium, and large manipulative elements form geometrical shapes when placed in the at least one holding tray.

7. A mathematical triangle kit of claim 2 wherein the small, medium, and large manipulative elements define fractional equivalents of one another when placed in the at least one holding tray.

8. A mathematical triangle kit of claim 1 wherein the small, medium, and large manipulative elements teach a participant trigonometry, algebra, geometry, multiplication, and addition when manipulated amongst one another.

9. A mathematical triangle kit for teaching mathematical and geometric relation skills of claim 1, consisting of: one large triangle, five small triangles, and three medium triangles.

10. A mathematical triangle kit for teaching mathematical and geometric relation skills of claim 9 wherein the one large triangle, five small triangles, and three medium triangles are arranged in a puzzle like fashion to fit into a holding tray.

11. A mathematical triangle kit for teaching mathematical and geometric relation skills of claim 1 wherein the small, medium, and large triangles are various colors.

12. A mathematical triangle kit for teaching mathematical and geometric relation skills of claim 1, comprising:

at least two large triangles, which are colored two different colors;

at least two medium triangles, which are colored two different colors; and at least two small triangles, which are colored two different colors; wherein there are only two colors.

13. A mathematical triangle kit of claim 1, further comprising at least one rectangular holding tray, wherein the holding tray is a small, medium, or large holding tray.

14. A mathematical triangle kit for teaching mathematical and geometric relation skills of claim 1, consisting of 8 large triangles, 18 medium triangles, and 24 small triangles.

15. A mathematical triangle kit for teaching mathematical and geometric relation skills of claim 1, further comprising a book for instructing a user how to employ said triangles in mathematical operations.

16. A mathematical triangle kit for teaching mathematical and geometric relation skills, comprising:

a. five small manipulative elements, wherein the small manipulative element is a right triangle with base angles of 30° and 60°;

b. three medium manipulative elements, wherein the medium manipulative element is a right triangle with base angles of 30° and 60°; and c. one large manipulative element, wherein the large manipulative element is a right triangle with base angles of 30° and 60°;

wherein a side opposite of the 60° angle of the small manipulative element is equal to a side opposite of the 30° angle of the large manipulative element; and wherein the hypotenuse of the small manipulative element is equal to a side opposite of the 60° angle of the medium manipulative element.

17. A method of teaching mathematical and geometric skills, comprising:

a. placing the large leg of a small right triangle with base angles of 30° and 60° next to the small leg of a large right triangle with base angles of 30° and 60°; and b. placing the large leg of a medium right triangle with base angles of 30° and 60° next to the hypotenuse of said small triangle, whereby a larger triangle is formed comprising said small, medium, and large triangles;

wherein a side opposite of the 60° angle of the small triangle is equal to a side opposite of the 30° angle of the large triangle; and wherein the hypotenuse of the small triangle is equal to a side opposite of the 60° angle of the medium triangle.

* * * * *